(12) United States Patent
McMurtry et al.

(10) Patent No.: US 9,038,282 B2
(45) Date of Patent: May 26, 2015

(54) INTERCHANGEABLE TASK MODULE COUNTERWEIGHT

(75) Inventors: David R. McMurtry, Dursley (GB);
Nicholas J. Weston, Peebles (GB);
Richard G. Dewar, Cardrona (GB);
Matthew H. Freeman, Cambridge (GB)

(73) Assignee: RENISHAW PLC, Wotton-Under-Edge (GB)

( * ) Notice: Subject to any disclaimer, the term of this patent is extended or adjusted under 35 U.S.C. 154(b) by 116 days.

(21) Appl. No.: 13/643,651

(22) PCT Filed: Apr. 19, 2011

(86) PCT No.: PCT/GB2011/000602
§ 371 (c)(1),
(2), (4) Date: Oct. 26, 2012

(87) PCT Pub. No.: WO2011/135282
PCT Pub. Date: Nov. 3, 2011

(65) Prior Publication Data
US 2013/0047452 A1    Feb. 28, 2013

(30) Foreign Application Priority Data
Apr. 30, 2010 (GB) .................... 1007186.8

(51) Int. Cl.
*G01B 5/012*    (2006.01)
*G01B 7/012*    (2006.01)
*G01B 5/00*     (2006.01)

(52) U.S. Cl.
CPC .............. *G01B 5/0016* (2013.01); *G01B 5/012* (2013.01); *G01B 7/012* (2013.01)

(58) Field of Classification Search
CPC ........ G01B 5/012; G01B 5/016; G01B 7/012; G01B 7/016; G01B 5/0016
USPC ............................ 33/503, 556, 559
See application file for complete search history.

(56) References Cited

U.S. PATENT DOCUMENTS 3,193,938 A * 7/1965 Willis .............................. 33/702
3,681,979 A   8/1972 Hammond, Jr.
3,785,056 A * 1/1974 Schiler ............................ 33/559
4,265,022 A   5/1981 Noguchi et al.
(Continued)

FOREIGN PATENT DOCUMENTS

CN    101275821 A    10/2008
DE    38 27 656 C1   8/1989
(Continued)

OTHER PUBLICATIONS

Braddick, "Mechanical Design of Laboratory Apparatus", 1960, pp. 11-30, Chapman & Hall, London.
(Continued)

*Primary Examiner* — Christopher Fulton
(74) *Attorney, Agent, or Firm* — Oliff PLC

(57) ABSTRACT

A method of operating a coordinate positioning apparatus comprising an articulated head having at least one rotational axis. The method comprises, in any suitable order, loading at least one interchangeable task module onto the articulated head; and loading at least one interchangeable task module counterweight on the articulated head. The at least one interchangeable task module counterweight at least partially counterbalances the weight of the at least one task module on the articulated head about the at least one axis.

27 Claims, 7 Drawing Sheets

(a)

(b)

(56) References Cited

U.S. PATENT DOCUMENTS

| | | | |
|---|---|---|---|
| 4,459,755 A * | 7/1984 | Gruhler | 33/832 |
| 4,651,405 A | 3/1987 | McMurtry et al. | |
| 4,854,050 A | 8/1989 | McMurtry et al. | |
| 5,088,046 A | 2/1992 | McMurtry | |
| 5,208,994 A | 5/1993 | McMurtry et al. | |
| 5,309,755 A * | 5/1994 | Wheeler | 73/105 |
| 5,971,903 A | 10/1999 | Hajdukiewicz | |
| 6,191,744 B1 * | 2/2001 | Snow et al. | 343/703 |
| 6,295,866 B1 * | 10/2001 | Yamamoto et al. | 73/105 |
| 6,298,569 B1 | 10/2001 | Raab et al. | |
| 6,354,167 B1 * | 3/2002 | Snow | 74/490.01 |
| 6,397,485 B1 | 6/2002 | McMurtry | |
| 7,024,783 B2 | 4/2006 | Trull et al. | |
| 7,086,170 B2 * | 8/2006 | Hajdukiewicz et al. | 33/558 |
| 7,676,942 B2 | 3/2010 | Jordil et al. | |
| 8,701,301 B2 * | 4/2014 | Nakayama et al. | 33/554 |
| 2005/0055839 A1 | 3/2005 | Brenner et al. | |
| 2011/0016995 A1 * | 1/2011 | McMurtry et al. | 73/866.5 |
| 2012/0291297 A1 * | 11/2012 | Ferrari | 33/503 |

FOREIGN PATENT DOCUMENTS

| | | |
|---|---|---|
| DE | 43 08 823 A1 | 9/1994 |
| DE | 10 2004 005 599 A1 | 8/2005 |
| EP | 0 402 440 B1 | 6/1995 |
| EP | 0 690 286 A1 | 1/1996 |
| EP | 2 120 037 A1 | 11/2009 |
| GB | 1 498 009 | 1/1978 |
| GB | 2 438 640 A | 12/2007 |
| JP | 554-125263 U | 9/1979 |
| JP | S5773610 U | 5/1982 |
| JP | S58-156207 U | 10/1983 |
| JP | S61-501379 A | 7/1986 |
| JP | S61-123984 U | 8/1986 |
| JP | H03-504278 A | 9/1991 |
| WO | WO 90/07097 A1 | 6/1990 |
| WO | WO 01/85403 A1 | 11/2001 |
| WO | WO 2007/129082 A1 | 11/2007 |

OTHER PUBLICATIONS

Feb. 13, 2012 International Search Report issued in International Application No. PCT/GB2011/000602.

Feb. 13, 2012 Written Opinion issued in International Application No. PCT/GB2011/000602.

Jul. 19, 2012 Search Report issued in British Patent Application No. GB1007186.8.

Oct. 8, 2014 Office Action issued in Chinese Patent Application No. 201180025547.1 (with translation).

Jan. 6, 2015 Office Action issued in Japanese Patent Application No. 2013-506726.

\* cited by examiner

INTERCHANGEABLE TASK MODULE COUNTERWEIGHT

The present invention relates to task modules, such as those suitable for use with a positioning apparatus such as a coordinate positioning apparatus, in particular probe modules for use on a coordinate measuring machine, and interchangeable task module counterweights.

Coordinate measuring machines typically comprise a base on which an artefact to be inspected can be supported, and a frame mounted on the base for holding a quill which in turn is suitable for holding, for instance, an artefact inspection device for inspecting the artefact. The base, frame and/or quill are typically configured such that the inspection device, such as a measurement probe, and artefact can be moved relative to each other along at least one axis, and more typically along three mutually orthogonal axes X, Y and Z. Motors can be provided for driving the inspection device held by the quill along those axes. It is also known to provide an articulated head onto which the inspection device is mounted. An articulated head typically has one, two or more rotational degrees of freedom so as to enable an inspection device mounted on the probe head to be moved about one, two or more axes of rotation. Such articulated heads are for example described in EP0690286 and EP0402440.

EP0690286 describes a so-called indexing probe head in which motors are used to move the inspection device between a plurality of predetermined, or "indexed", orientations. Once the head is set in the desired position, inspection of a part is performed with the inspection device by moving the frame and/or quill of the machine. In other words, the indexing probe head is locked in a fixed position whilst inspection takes place and does not require operation of the motor to hold the position of the inspection device.

WO9007097 describes a further type of articulated probe head which is often termed an "active" or "servoing" head. Herein, such heads are termed active heads. In such an arrangement, the motor(s) of the active head is constantly servoed in order to control the orientation of the inspection device, e.g. either to hold the orientation of the inspection device or to change the orientation of the inspection device, for instance whilst measurements are taken.

With both types of articulating head, the motor(s) of the head needs to have sufficient torque to overcome the weight of the inspection device in order to move it to a desired position. In the case of the active heads, the motor(s) of the head also need to be able to continuously work in order to maintain the position of the inspection device during measurement.

As will be understood, heads such as those described above can be adapted to carry tools for working on an artefact, as well as or instead of for inspecting an artefact.

Accuracy is often a key requirement of a coordinate positioning machine. Developers of coordinate positioning apparatus are constantly striving for ways of providing coordinate positioning apparatus having greater accuracy.

At the same time, in many circumstances versatility is also an important requirement of a coordinate positioning apparatus. It can be advantageous to interact with a single part with different types or sizes of inspection devices and tools. Further, different parts are often inspected on and/or worked on the same machine and these can require different types of inspection devices and tools. For instance, when inspecting an artefact, it might be desirable to use contact probes (for example, a touch-trigger probe) and non-contact probes (for example, an optical probe) on the same coordinate positioning apparatus.

This invention relates to a system of at least one interchangeable task module and at least one changeable counterweight module which can be changed to reduce the extent by which the articulated head (on which at least one task module is mounted) is out-of-balance about at least one of its at least one rotational axis during use.

In particular, a coordinate positioning apparatus could have an articulated head having at least one axis of rotation; at least one task module interchangeably mountable to the articulated head; and at least one changeable task module counterweight which can be used to reduce the extent by which the articulated head is out-of-balance about its at least one rotational axis. The at least one changeable task module counterweight can be changed so as to at least partially counterbalance the weight of the at least one task module about the at least one axis of rotation and thereby reduce the extent by which the articulated head is out-of-balance about its at least one rotational axis.

According to a first aspect of the invention there is provided a method of operating a coordinate positioning apparatus comprising an articulated head having at least one rotational axis, comprising, in any suitable order: loading at least one interchangeable task module onto the articulated head; and loading at least one interchangeable task module counterweight onto the articulated head so as to reduce the extent by which the articulated head is out-of-balance about its at least one rotational axis.

The provision of an interchangeable counterweight means that a suitable counterweight set-up can be used to reduce the extent by which the articulated head is out-of-balance about the at least one axis. In particular embodiments, the provision of an interchangeable counterweight means that a suitable counterweight can be used to at least partially counteract the weight of the at least one task module currently to be used on the head. This can mean that less torque is required to reorient the task module and also to hold the task module in position. This in turn reduces the power requirements of the articulating head's motors. If desired, this enables smaller, less powerful motors to be used, even when the coordinate positioning apparatus is to be used with a range of different task modules including large, heavy task modules. As less power is used by the articulated head when using the interchangeable counterweight of the invention, the amount of heat generated by the articulated head's motor(s) when in use can be significantly reduced. This can be a significant advantage during measuring operations because heat can be a significant source of error in coordinate positioning machines due to thermal expansion effects.

Furthermore, the ability to reduce the extent by which the articulating head is out of balance can reduce the amount of wobble experienced by the head during rotation about the at least one axis. Again, this can improve the precision of movement of the articulated head. In embodiments in which an articulated head is used to carry a measurement probe, this can improve the accuracy of the measurements obtained.

The at least one interchangeable task module counterweight could be changeable such that its counterbalance effect is changeable. Accordingly, the method could further comprise changing the interchangeable task module counterweight. For instance, the interchangeable task module could be changeable in that the position of its centre of mass relative to the at least one axis of rotation is changeable. For instance, the at least one interchangeable task module could comprise at least one moveable counterbalance weight. The at least one moveable counterbalance weight could be movable between a position proximal the at least one axis of rotation and a position distal the at least one axis of rotation so as to alter the gravitational torque the counterbalance weight exerts about the at least one axis. Accordingly, the method could further comprise changing the interchangeable task module counterweight's centre of mass position to further counterbalance the weight of the at least one task module.

The at least one interchangeable task module counterweight could comprise an active member for effecting the change of the position of the centre of mass of the at least one changeable task module counterweight. For instance, the at least one interchangeable task module counterweight could comprise at least one motor. Optionally, the at least one interchangeable task module counterweight could be a passive member. For instance, interaction with an external device, tool and/or user might be required in order to move the position of the centre of mass of the at least one changeable task module counterweight relative to the at least one axis.

The at least one changeable task module counterweight can be interchangeably mounted to the articulated head. The at least one interchangeable task module counterweight can be provided in addition to, or instead of, a task module counterweight that is fixed to the articulated head, for instance a changeable task module counterweight that is fixed to the articulated head and has a moveable centre of mass, much like that described above.

A plurality of different interchangeable task module counterweights can be provided, each of which can be interchangeably mounted on the articulated head. When not mounted on the articulated head, the plurality of different interchangeable task module counterweights could be stored in a storage rack. Accordingly, the method could comprise loading on the articulated head at least one interchangeable task module counterweight that is stored in a storage rack.

Preferably, the at least one interchangeable task module counterweight is automatically changeable. In particular, preferably the at least one task module counterweight is automatically interchangeable. For instance, preferably a task module counterweight can be loaded and unloaded to and from the articulated head by the cooperation of the coordinate positioning apparatus with a storage rack for the interchangeable task module counterweight. Accordingly, the storage rack can preferably be in the coordinate positioning machine's operating volume. In other words, the coordinate positioning apparatus can comprise an interchangeable task module counterweight rack for the at least one interchangeable task module counterweight via which the coordinate positioning apparatus can load/unload the at least one interchangeable task module counterweight onto/from the articulated head. Accordingly, the method could further comprise driving the articulated head so as to automatically load onto the articulated head at least one interchangeable task module counterweight stored in a rack located in the coordinate positioning machine's operating volume.

Preferably, the coordinate positioning apparatus can be programmed so as to cause the changing of the at least one interchangeable task module counterweight. In particular, preferably the coordinate positioning apparatus can be programmed so as to cause the loading and/or unloading of an interchangeable task module counterweight onto and/or from the articulated head. Preferably, the coordinate positioning apparatus can be programmed so as to cause the changing of one interchangeable task module counterweight for another task module counterweight.

An interchangeable task module counterweight could be mounted on the articulated head via a mechanical coupling, such as a hook arrangement, which can be released by the interaction of the coordinate positioning apparatus with the rack. Optionally, the interchangeable task module counterweight can be mounted to the articulated head via a bayonet mount. Optionally, the interchangeable task module counterweight could be mounted to the articulated head via a releasable attracting mechanism, such as via a magnetic arrangement. The magnetic arrangement could be a permanent magnetic mechanism or for instance an electromagnetic mechanism. Preferably, the mount between the interchangeable task module counterweight and articulated head can be released by at least one of the pulling, sliding, peeling or screwing of the interchangeable task module counterweight away from the articulated head.

Likewise, the at least one task module can also be interchangeable (for example automatically interchangeable), in any of the manners described above. In particular, the storage rack for the at least one interchangeable task module counterweight could also be suitable for storing at least one task module. Optionally, a second storage rack, separate to the storage rack for the at least one interchangeable task module counterweight, could be provided for storing the at least one task module.

The at least one task module can comprise the at least one interchangeable task module counterweight. That is, a task module and an interchangeable task module counterweight could be provided as a single, integrated part. In this case, the at least one interchangeable task module and at least one interchangeable task module counterweight will be interchangeably mounted to the articulated head together. In other words, the loading of the at least one interchangeable task module and at least one interchangeable task module counterweight can be performed contemporaneously. Accordingly, the method can comprise contemporaneously mounting the at least one interchangeable task module and at least one interchangeable task module counterweight.

Optionally, the at least one interchangeable task module counterweight and at least one interchangeable task module are provided as separate parts. In particular, optionally the at least one interchangeable task module counterweight can be loaded onto the articulating head separately (e.g. non-contemporaneously, in other words at temporally distinct times) to the at least one interchangeable task module. Accordingly, the method can comprise mounting one of the at least one interchangeable task module and interchangeable task module counterweight onto the articulated head and subsequently mounting the other onto the articulated head. As will be understood, the loading of the at least one interchangeable task module counterweight can be performed either before or after the loading of the at least one interchangeable task module. However, as will be understood, even when the at least one interchangeable task module counterweight and at least one interchangeable task module are provided as separate parts, they can still be mounted onto the articulated head together, i.e. contemporaneously. For example, this can be the case when one of the interchangeable task module and the interchangeable task module counterweight is mounted to the articulated head via the other (as explained in more detail below), and the interchangeable task module and interchangeable task module counterweight have been pre-mounted to each other (e.g. although they are provided as separate parts they might be stored in a storage rack in an assembled state).

Optionally, the at least one interchangeable task module counterweight and at least one task module can be mounted to substantially the same side of the articulated head. Preferably, the at least one interchangeable task module counterweight and the at least one interchangeable task module can be mounted to the articulated head via the same task module mount on the articulated head. For example, one of the at least one interchangeable task module and at least one interchangeable task module counterweight can be loaded onto (e.g. stacked on top of) the other. For instance, an interchangeable task module could be mounted to the articulated head via the at least one interchangeable task module counterweight. For example, an interchangeable task module counterweight could be mounted directly to the articulated head, and an interchangeable task module could be mounted directly to the interchangeable task module counterweight. Accordingly, the at least one interchangeable task module could be stacked onto the at least one interchangeable task module counterweight. Accordingly, the method can comprise loading at least one interchangeable task module counterweight directly onto the articulated head and loading at least one interchangeable task module directly on to the at least one interchangeable task module counterweight. Again, this could be performed in any suitable order (e.g. the at least one interchangeable task module could be mounted directly onto the at least one interchangeable task module counterweight before or after the at least one interchangeable task module counterweight is mounted directly onto the articulated head). Optionally, an interchangeable task module counterweight could be mounted to the articulated head via the interchangeable task module. For example, an interchangeable task module could be mounted directly to the articulated head, and an interchangeable task module counterweight could be mounted directly to the at least one interchangeable task module.

Optionally, the articulated head can have separate mounts for the at least one interchangeable task module and at least one interchangeable task module counterweight. The mount for the at least one interchangeable task module and the mount for the at least one interchangeable task module counterweight can be on substantially opposing sides of the head. Optionally, the mount for the at least one task module and the mount for the at least one interchangeable task module counterweight can be on substantially the same side of the head.

The at least one interchangeable task module counterweight can be configured such that its centre of mass lies beyond the axis of rotation relative to the centre of mass of task module so as to at least partially counterbalance the weight of the at least one task module. Accordingly, when not directly above or below the axis of rotation, the interchangeable task module counterweight will provide a gravitationally derived moment opposite to that of the task module, about the at least one axis of rotation. Preferably, this is the case throughout the articulated head's entire permitted range of motion about the at least one axis of rotation. In embodiments in which an interchangeable task module counterweight is mounted to the articulated head on the same side as the task module (e.g. when the task module and task module counterweight are mounted via the same mount, or are provided as a single integrated part), then this may entail providing at least one arm for locating the centre of mass of the interchangeable task module counterweight beyond the axis of rotation relative to the centre of mass of task module. The at least one arm could extend around the outside of the articulated head. Optionally, the at least one arm could extend through a channel in the articulated head.

The task module could be a probe module. The probe module can comprise componentry for sensing an artefact. That is the probe module could be a probe sensor module. Accordingly, the probe module could be a probe module for interacting with an artefact. For instance, the probe module could be an artefact inspection tool for inspecting the artefact. The probe module could be a device for determining at least one of the hardness, surface finish and/or temperature of the part. The probe module could be a device for performing non-destructive testing of the part, e.g. via ultrasonic methods. Optionally, the probe module could be a device for measuring the dimensions of the artefact. Such a suitable device includes measurement probes. The probe module can be a contact probe. In this case, the probe module can comprise a probe body from which a stylus having a stylus tip for contacting an artefact extends. As will be understood, such measurement probes can comprise touch-trigger probes which issue a signal when contact between the stylus and a surface is detected, and also comprise analogue probes (also known as scanning probes) which provide a measure of deflection of the stylus relative to the probe body.

The probe module could be a non-contact probe. The non-contact probe could comprise at least one of an optical probe, capacitive probe or inductive probe. The present invention can be particularly useful with optical probes due to their relatively high weight compared to other types of probes.

Suitable metrological devices, and in particular suitable measurement probes modules for use with the method of the present invention are discussed in more detail below.

As will be understood, the at least one probe module need not necessarily comprise sensor componentry. For instance, it could be an extension bar module for increasing the distance between a probe sensor module and the articulated head.

The task module could comprise a tool module. The tool module could comprise a tool for interacting with a part to process the part. For instance, the tool could be for working the part, e.g. to machine, etch or cut the part. The tool could be for carrying the part, e.g. it could be a pick and place tool. The tool could also be for a dispensing tool, such as tool for dispensing fluid to a workpiece. Furthermore, the tool could be a bonding tool which is used to apply a force to a workpiece. Suitable tool modules include laser tool modules, cutting tool modules, e.g. drilling or milling tool modules. As will be understood, the at least one tool module need not necessarily comprise the tool for interacting with the part. For instance, it could be an extension bar module for increasing the distance between a tool module having a tool for interacting with the part and the articulated head.

The at least one interchangeable task module counterweight can be configured such that the moment about the at least one rotational axis caused by at least one task module's loaded on the articulated head is counterbalanced by at least 50%, preferably by at least 75%, more preferably by at least 90%. The interchangeable task module counterweight can be configured so as to substantially balance the articulated head about the at least one axis. This can be such that in a state of rest substantially zero torque is required to hold the task module in a given orientation about the at least one axis. In particular, the changeable task module counterweight can be configured so as to substantially counterbalance the task module about the at least one axis. In particular, the task module counterweight can be configured such that the resultant centre of mass of what is mounted on the articulated head lies substantially on the at least one axis of rotation. In the embodiments in which the at least one task module counterweight comprises an interchangeable task module counterweight, the interchangeable task module counterweight can correspond to the task module. In particular, the coordinate positioning apparatus could comprise a plurality of interchangeable task modules for loading onto the articulated head and a plurality of corresponding interchangeable task module counterweights which can be selected for use with its corresponding task module so as to substantially counterbalance its corresponding task module about the at least one axis.

A single task module counterweight could be used to counterbalance the task module about the at least one axis. A plurality of interchangeable task module counterweights could be provided. At least some of the plurality of interchangeable task module counterweight could be configured such that their counterbalance effect when mounted on the articulated head is substantially the same or could be different. Optionally, a plurality of counterweights could be used together to substantially counterbalance the task module. For instance, the counterweights could have mounting features which enable the stacking of counterweights. Optionally the method can comprise loading a plurality of interchangeable task module counterweights onto the articulated head. Further optionally the method can comprise stacking a plurality of interchangeable task module counterweights onto each other on the articulated head.

The interchangeable task module counterweight can comprise electronic componentry used by the task module. Accordingly, the counterweight could be provided by something whose function is not merely to provide weight. For example, the interchangeable task module counterweight could comprise a power source for the task module. For instance, the interchangeable task module counterweight could comprise a battery for supplying power to the power source. Optionally, the counterweight could comprise a processor for processing task module data.

The interchangeable task module counterweight could be configured such that it is free from contact with the articulated head and/or coordinate positioning apparatus at all possible orientations about the at least one axis of rotation. Preferably, the interchangeable task module counterweight is configured such that it does not interfere with the rotation of the articulated head about it's at least one axis of rotation throughout the articulated heads full range of rotational motion. Optionally, the interchangeable task module counterweight can be configured to contact the articulated head at at least one orientation about the at least one axis of rotation. Optionally, the interchangeable task module counterweight can comprise an anti-rotation member that is configured to engage the articulating head and/or the quill on which it is mounted at least at least one orientation about the at least one axis of rotation. This can help to resist the tendency of the at least one interchangeable task module to rotate and break away from its mount on the articulated head if the articulated head comes to a sudden halt at the at least one orientation. For instance, the changeable task module counterweight's anti-rotation member could be configured to contact the articulated head (and/or quill on which it is mounted) at, or as the articulated head approaches, one of the extremes of rotation of articulated head. In particular, the articulated head may have at least one end stop for restricting motion about the at least one axis, and the changeable task module counterweight's anti-rotation member could be configured to contact the articulated head just before, or at the point, the articulated head is at its end stop position. This can help prevent damage to the articulated head, task module and/or changeable task module counterweight in the event of an articulated head power failure which results in the articulated head rotating freely.

As described above, an interchangeable task module counterweight could be adjustable in order to change its counterbalance effect. For instance, the position of the centre of mass of the task module counterweight could be adjustable so that it can be used as a suitable counterweight for a plurality of different task modules having different weights. Furthermore, the adjustability of the task module counterweight could help fine tune the counterbalance effect of the task module counterweight. This could be helpful when it is desired to substantially counterbalance the weight of the task module. In these cases, the interchangeable task module counterweight could be manually adjustable (e.g. require user intervention to move the position of the centre of mass of the task module counterweight) or automatically adjustable (e.g. motors could be provided which can be operated, for example by a processor, such as a controller of a coordinate positioning apparatus) to move the position of the centre of mass of the task module counterweight).

Optionally, the interchangeable task module counterbalance could comprise a plurality of removable weights. The weights can be removed or added so as to help substantially counterbalance the weight of the task module.

The articulated head could be configured to be inherently unbalanced about the at least one axis of rotation. Accordingly, the articulated head could be permanently counterweighted about the at least one axis so that when no task module or task module counterweight is mounted on the articulated head, the articulated head is unbalanced about the at least one axis of rotation. In particular, the rotatable part of the articulated head which provides the task module mount, which is rotatable about the at least one axis, could be counterweighted on one side. The rotatable part could be counterweighted on the side which comprises the features for mounting with the task module. It can be preferred that the rotatable part is counterweighted on the side opposite to the side which comprises the features for mounting with the task module. Accordingly, in this case, the counterweighted rotatable part will provide some counterbalance to the task module. This can reduce the requirements on the interchangeable task module counterweight.

The articulated head can be an indexing head or an active head.

As will be understood, a plurality of task modules could be mounted to the articulated head. For example, this could be the case when the task module comprises an extension bar for increasing the distance between a task module which interacts with the part and the articulated head. In these cases the task module counterweight can be configured to substantially counterbalance the plurality of task modules. Accordingly, the method can comprise loading a plurality of task modules onto the articulated head. Optionally the method can comprise stacking a plurality of interchangeable task modules onto each other on the articulated head. Optionally, in line with the description above, one or indeed a plurality of task module counterweights could be provided to counterbalance the weight of the plurality of task modules.

Preferably the articulated head has at least two axes of rotation, more preferably at least two substantially orthogonal axes of rotation. Accordingly, the articulated head could comprise a second axis of rotation. In this case, the at least one changeable task module counterweight could also reduce the extent by which the articulated head is out-of-balance about the second axis of rotation. The second axis of rotation can be substantially perpendicular to the first axis of rotation. The second axis of rotation can intersect the first axis of rotation. The at least one changeable task module counterweight could be configured such that the resultant centre of mass of what is mounted on the articulated head lies substantially on the second axis of rotation. In particular, the at least one changeable task module counterweight could be configured such that the resultant centre of mass of what is mounted on the articulated head lies substantially on the first and second axes of rotation.

According to a second aspect of the invention there is provided a coordinate positioning apparatus comprising: an articulated head having at least one axis of rotation; at least one task module interchangeably mounted to the articulated head; and at least one interchangeable task module counterweight which at least partially counterbalances the weight of the at least one task module about the at least one axis of rotation.

As will be understood, the features and embodiments described above in connection with the first aspect of the invention are equally applicable and relevant to this second aspect of the invention.

According to a third aspect of the invention there is provided a task apparatus comprising a task module for interchangeably mounting onto an articulated head of a coordinate positioning machine having at least one axis of rotation, and at least one corresponding task module counterweight for interchangeably mounting onto the articulated head so as to reduce the extent by which the articulated head is out-of-balance about its at least one rotational axis. In particular, preferably the at least one corresponding task module counterweight is for at least partially counterbalancing the weight of the task module about the at least one axis. As will be understood, the features and embodiments described above in connection with the first and second aspects of the invention are equally applicable and relevant to this third aspect of the invention.

Embodiments of the invention will now be described with reference to the following drawings, in which:

FIGS. 7(a) and (b) are schematic side views of further embodiments of the invention, in which a non-contact optical probe is mounted on the articulated head;

FIGS. 11(a) and (b) are schematic side views of a yet further embodiment of the invention.

Figure 1:
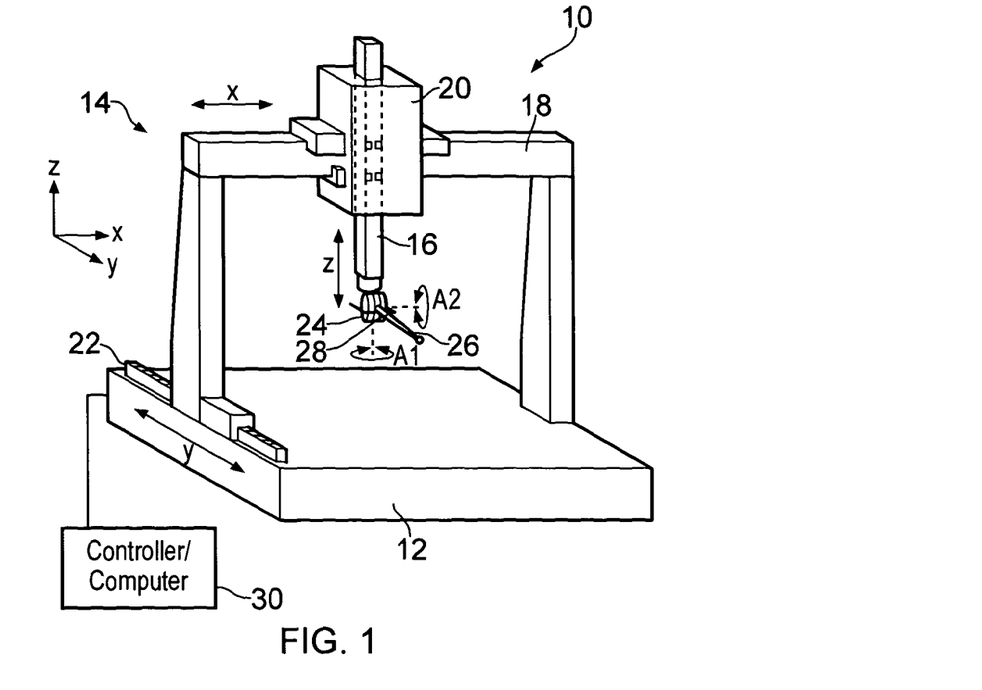
FIG. 1 is a schematic isometric view of a coordinate positioning machine according to the present invention.
Figure 2:
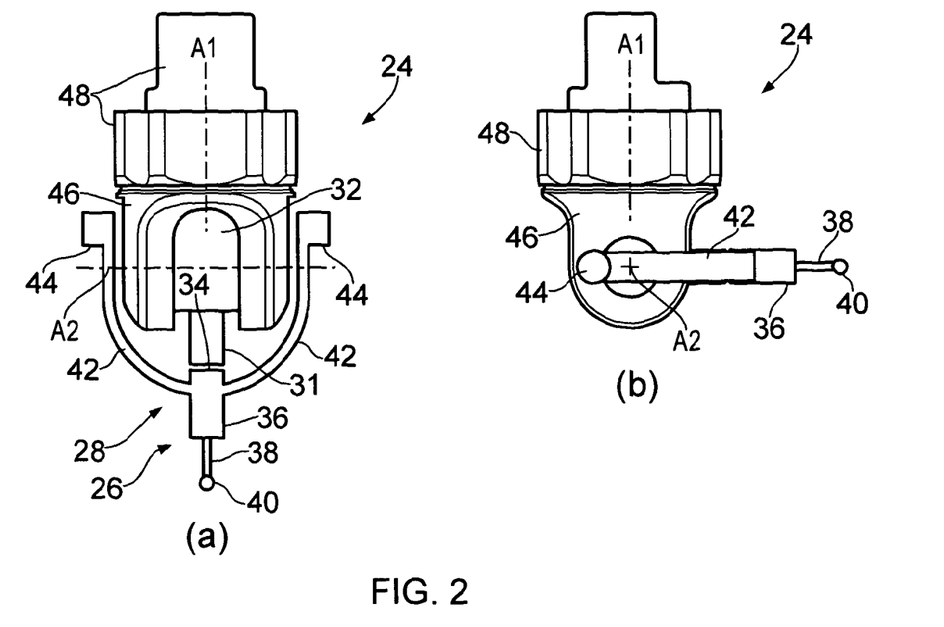
FIGS. 2(a) and 2(b) are schematic front and side views respectively of the articulated head, probe module and integrated probe module counterweight shown in FIG. 1.

Referring to FIG. 1, there is shown a coordinate positioning machine, and more particularly a coordinate measuring machine (CMM) 10, according to the present invention. The CMM 10 has a table 12 on which a workpiece to be measured (not shown) can be mounted and a frame 14 which carries an articulated probe head 24, which in turn carries a surface sensing device in the form of a contact probe 26. The frame 14 facilitates movement of the articulated probe head 24 in three orthogonal dimensions, X, Y and Z under the control of a controller 30. In particular, the frame comprises a bridge 18 (which can move in the Y dimension along the track 22 provided on the table 12), a carriage 20 (which can move in the X dimension along the bridge's 18 crossbar, and a Z-column 16 (which can move in the Z dimension through the carriage 20). As will be understood, bearing arrangements, motors and transducers (not shown) are provided in the track 22, bridge 18, carriage 20 and Z-column 16 for facilitating such motion and for reporting the relative positions thereof back to the controller 30.

The articulated probe head 24 mounted on the Z column 16 of the CMM 10 is an active head which has two substantially orthogonal axes of rotation about which the contact probe 26 can be oriented; A1 which is substantially parallel to the Z axis and A2 which is substantially perpendicular to the Z axis.

A controller 30 is provided for controlling the motion of the contact probe 26 and also for receiving and collecting transducer information from all of the transducers in the CMM 10 so as to be able to measure a workpiece placed on the table 12 which is being inspected by the contact probe 26. As will be understood, the controller 30 could comprise a computer, for instance a personal computer (PC) or the controller could be connected to an external computer.

In the embodiment shown, the contact probe 26 is mounted on the articulated probe head 24 via an intermediate member in the form of a probe counterweight 28. The probe counterweight 28 comprises arms which are arranged such that weights at the ends of the arms extend beyond the A2 axis of rotation relative to the contact probe 26 such that they counterbalance the weight of the contact probe 26. The probe counterweight 28 and various embodiments thereof will be described in more detail below with reference to FIGS. 2 to 11.

FIGS. 2(a) and (b) show the articulated probe head 24 of FIG. 1, the contact probe 26 and the probe counterweight 28. In this particular embodiment, the contact probe (designated generally by reference 26) and probe counterweight (designated generally by reference 28) are provided as a single integrated part. The integrated contact probe and probe counterweight are mounted to the articulated probe head 24 via a probe module mount 31 provided on a rotatable part 32 of the articulated head. The probe module mount 31 has magnets for attracting magnets (not shown) in the mounting face 34 of the integrated contact probe and probe counterweight. The probe module mount 31 also has alignment features (not shown) which cooperate with corresponding alignment features (not shown) provided on the mounting face 34 of the integrated contact probe and probe counterweight so as to ensure repeatable mounting between the two.

For instance, such alignment features could comprise kinematic mount features so as to provide a kinematic mount between the probe mount 31 and the integrated contact probe and probe counterweight. As will be understood a kinematic mount is one which has elements on one part which are arranged to cooperate with elements on another part to provide highly repeatable positioning. The elements are arranged to cooperate with each other so as to constrain relative movement between the parts in all six degrees of freedom (i.e. three perpendicular linear degrees of freedom and three perpendicular rotational degrees of freedom) preferably by six points of contact or constraints. In one particular embodiment, the elements on one of the parts can be arranged to provide a pair of mutually converging surfaces at each of three spaced locations, in such a manner as to provide a total of six points of contact with the elements on the other part. This constrains the six possible degrees of freedom of one part relative to the other. Such a kinematic mount is sometimes known as a Boys support, and is described in, for example, H. J. J. Braddick, "Mechanical Design of Laboratory Apparatus", Chapman & Hall, London, 1960, pages 11-30.

As will be understood, the integrated contact probe and probe counterweight could be mounted to the articulated head via non-kinematic mechanisms. For instance, the integrated contact probe and probe counterweight could be clamped to the probe module mount 31. For instance, the integrated contact probe and probe counterweight could have a spigot which can be clamped within a chuck provided by the probe module mount 31.

The rotatable part 32 of the articulated head can rotate about the A2 axis relative to a head body 46 which is fixed relative to the A2 axis. The head body 46 is however rotatable about the A1 axis relative to articulated head's Z-column mount 48. Motors (not shown) are provided for facilitating such rotation on demand from the controller 30 and transducers (not shown) in the form of encoders are provided for measuring the orientation of the head body 46 and rotatable part 32 about their respective rotational axes A1 and A2.

As shown, the contact probe 26 comprises a probe body 36 from which a stylus 38 having a contact tip 40 extends. In the embodiment described the contact probe 26 is a touch trigger probe. Accordingly, the probe body 26 houses componentry for sensing the deflection of the stylus 38 relative to the probe body 36 and outputting a trigger signal in response thereto. The trigger signal causes the readings of the transducers of the CMM 10 to be supplied to the controller 30 so that the position of the contact tip 40 can be recorded and hence a measurement of the artefact taken.

The probe counterweight 28 comprises a pair of arms 42 which extend from the probe body 36 and a pair of counterbalance weights 44 mounted at the ends of the arms distal to the probe body 36. As shown, the arms extend around, and on opposing sides of, the head body 46, far enough to place the counterbalance weights 44 beyond the A2 axis relative to the contact probe 26 such that the counterbalance weights 44 counterbalance the weight of the contact probe 26. In the embodiment described, the counterbalance weights 44 are configured so as to substantially counterbalance the weight of the contact probe 26 such that the centre of mass of what is mounted on the articulated head's probe mount 31 (i.e. in this case the integrated contact probe and probe counterweight) lies on the A2 axis. However, as will be understood this need not necessarily be the case. For instance, the probe counterweight 28 might only partially counterbalance the weight of the probe, or might over counterbalance the weight of the probe. However, the probe counterweight 28 should be configured to provide some counterbalance effect so as to decrease rather than increase the amount of torque required to change and hold the orientation of the contact probe 26 about the A2 axis.

Figure 3:
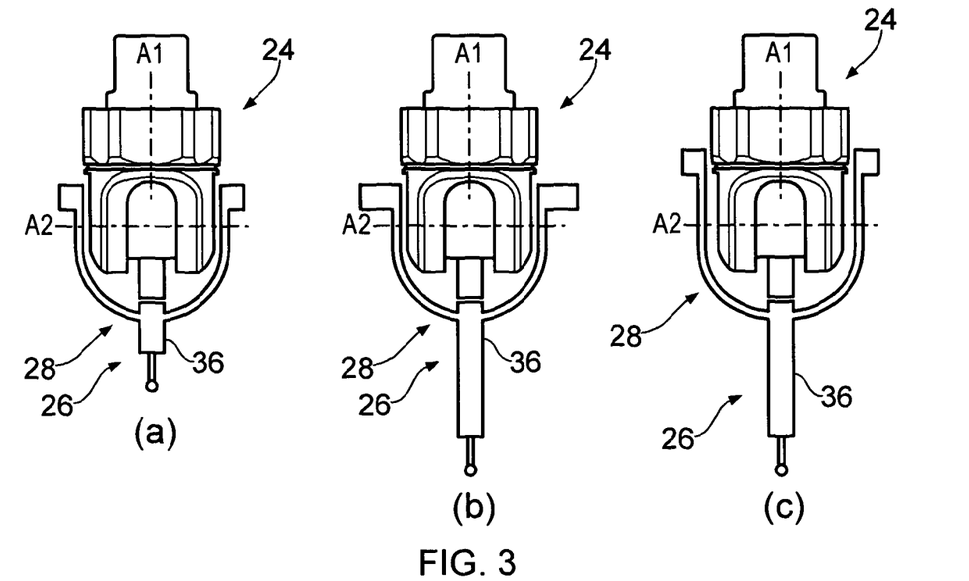
FIGS. 3(a), 3(b) and 3(c) are schematic front views of first, second and third embodiments of a probe module and integrated probe module counterweight mounted on an articulated probe head.

As will be understood, different probes could be mounted on the articulated head, having different weights and/or lengths which can require different configurations of counterbalance weights. This is illustrated with reference to FIGS. 3(*a*), 3(*b*) and 3(*c*). FIG. 3(*a*) is the same as FIG. 2(*a*) and is repeated for reference. FIGS. 3(*b*) and 3(*c*) are substantially the same as that shown in FIG. 2(*a*) and so like parts share the like reference numerals. However, as can be seen, in FIGS. 3(*b*) and 3(*c*) the probe body 36 of the contact probe 26 is significantly longer than that of the contact probe 26 of FIGS. 3(*a*) and 2. On the basis that the contact probes in FIGS. 3(*a*) to 3(*c*) are entirely the same other than their lengths the centre of mass of the contact probe 26 in FIGS. 3(*b*) and 3(*c*) will be further away from the A2 axis than that of FIG. 3(*a*). Accordingly, in the embodiment shown in FIG. 3(*b*) the weight of the counterbalance weights 44 is greater to counterbalance the longer probe body 36. In FIG. 3(*c*) the weight of the counterbalance weights 44 is the same as that shown in FIG. 3(*a*), but the arms 42 are longer so as to place the counterbalance weights 44 further away from the A2 axis so as to counterbalance the longer probe body 36.

Figure 9:
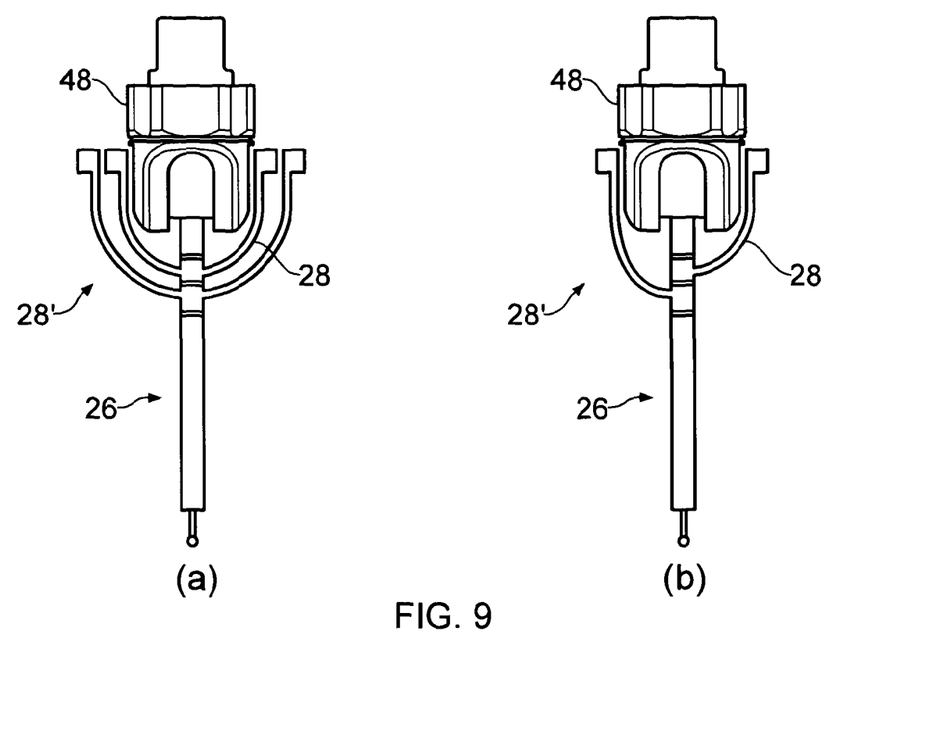
FIGS. 9(a) and 9(b) are schematic front views of embodiments of the invention in which stacked probe module counterweights are used to counterbalance the weight of the probe module.

FIG. 9(*a*) illustrates that rather than providing a single probe counterweight having large counterbalance weights or having arms that extend a long way beyond the A2 axis, multiple probe counterweights (e.g. first and second probe counterweights) 28 and 28' can be stacked to counterbalance the weight of a long and/or heavy contact probe 26. FIG. 9(*b*), shows a similar set up the counterbalance weight, but in which rather than counter weights extending on each side of the head, one of the probe counterweights (e.g. the first probe counterweight) 28 extends on one side of the head only and the other probe counterweight (e.g. the second probe counterweight) 28' extends on the opposite side of the head. Furthermore, as will be understood, and as shown, the second probe counterweight 28' can be provided as part of (e.g. as an integral part of) the probe 26.

Figure 4:
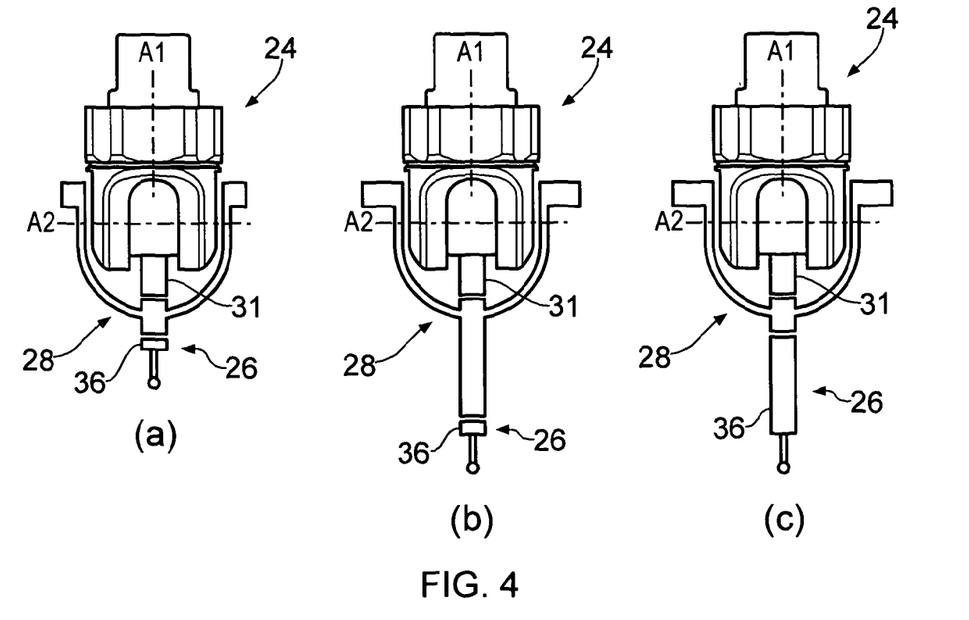
FIGS. 4(a), 4(b) and 4(c) are schematic front views of first, second and third embodiments of a probe module and separate probe module counterweight mounted on an articulated probe head.
Figure 5:
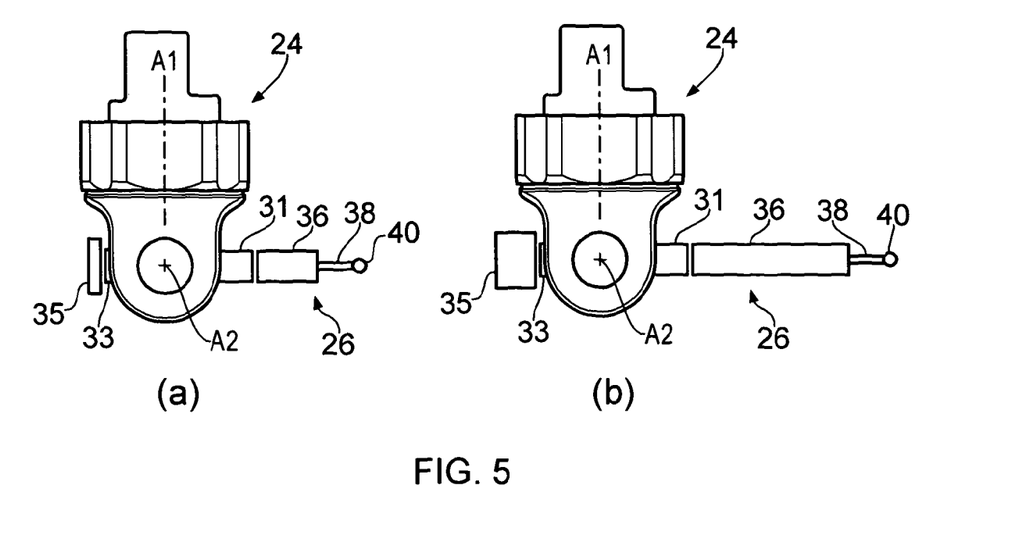
FIGS. 5(a) and 5(b) are schematic side views of an articulated probe head, probe module and separate probe module counterweight according to further embodiments of the invention.
Figure 6:
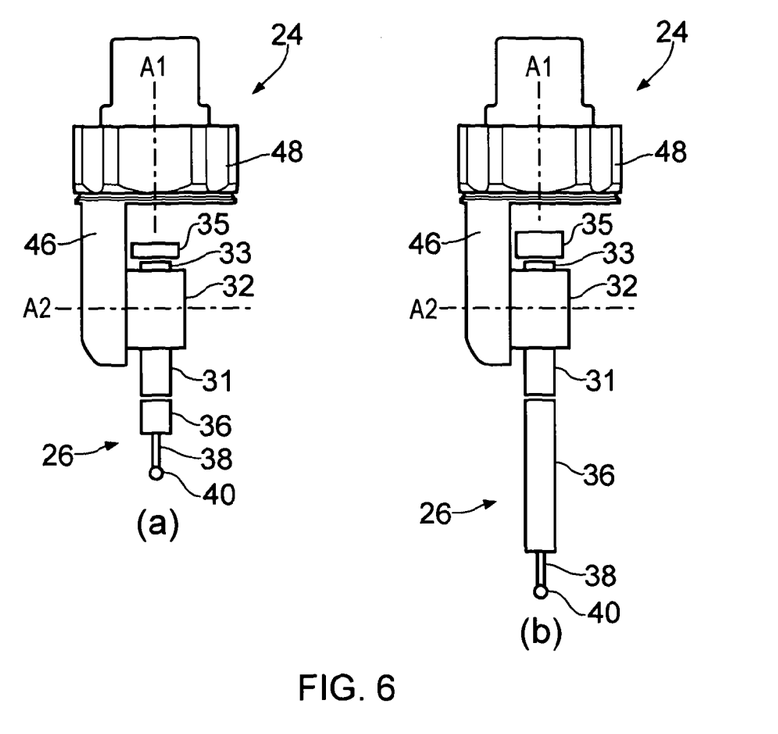
FIGS. 6(a) and 6(b) are schematic front views of an articulated probe head, probe module and separate probe module counterweight according to further embodiments of the invention.

The embodiments shown in FIGS. 4(*a*) to 4(*c*) are substantially the same as those shown in FIGS. 3(*a*) to 3(*c*) and like parts share like reference numerals. However, whereas in the embodiments shown in FIGS. 3(*a*) to 3(*c*) an integrated contact probe and probe counterweight is provided, the contact probe 26 and probe counterweight 28 are provided as separate pieces. In the embodiments shown, the probe counterweight 28 is directly mounted to the probe mount 31 and the contact probe 26 is directly mounted to the probe counterweight 28 via a similar mount configuration (e.g. magnets and alignment features). In FIGS. 4(*b*) and 4(*c*) the contact tip is further away from the A2 than in FIG. 4(*a*). In FIG. 4(*b*) this is facilitated by the probe counterweight having a long body (and in effect acts as an extension bar) whereas in FIG. 4(*c*) this is facilitated by the contact probe's probe body 36 being longer than that of FIG. 4(*a*). As will be understood, this could also be achieved by placing an extension bar between the probe counterweight 28 and the contact probe 26, or between the probe mount 31 and the probe counterweight 28.

As will also be understood, in another embodiment, when the contact probe and probe counterweight are provided as separate pieces, the contact probe 26 could be directly mounted onto the probe mount 31 and the probe counterweight 28 could be mounted directly onto the contact probe 26. For instance, the probe body 26 could provide features on which the probe counterweight 28 could be mounted, or the probe counterweight 28 could be clamped onto and around the probe body 36.

Figure 7:
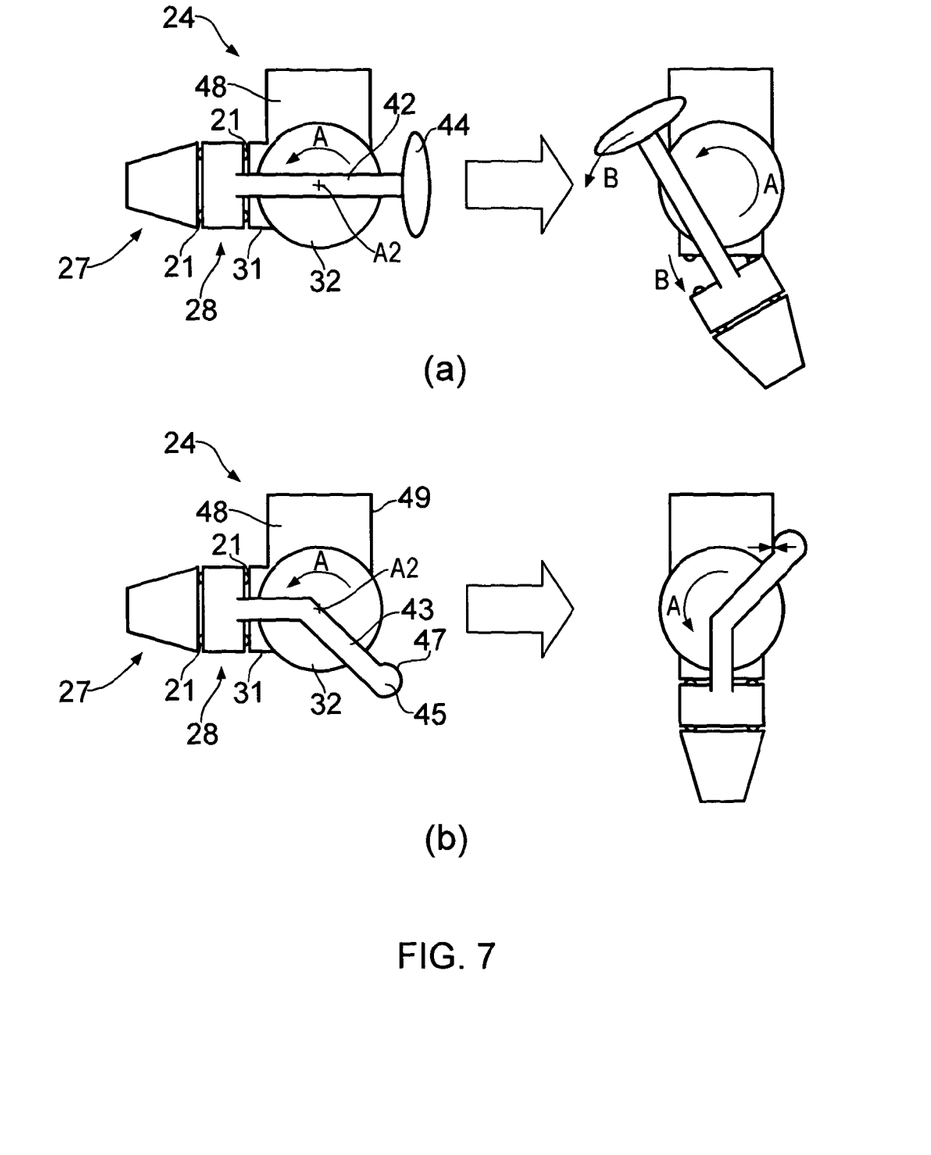
Figure 8:
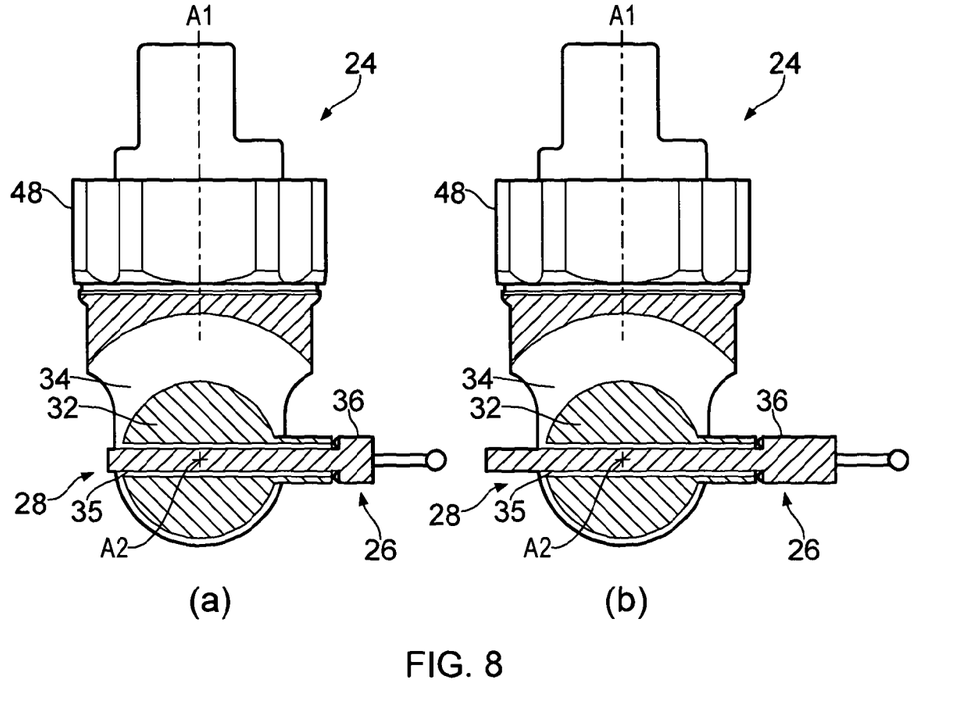
FIGS. 8(a) and 8(b) are schematic cross-sectional views of embodiments of the invention in which the probe module counterweight extends through the articulated head.

As can be seen in the above embodiments, the probe counterweight 28 is configured such it does not interfere with the rotation of the contact probe 26 about the A1 and A2 axes. In particular, the arms 42 and counterbalance weights 44 are completely clear of the articulated head 24 in all possible orientations of the contact probe 26. Nevertheless, as will be explained with reference to FIGS. 7(*a*) and 7(*b*) this need not necessarily be the case. FIGS. 7(*a*) and 7(*b*) show alternative but similar embodiments of the invention and like parts share like reference numerals. In these embodiments, the contact probe has been replaced with a non-contact, optical probe 27.

In this embodiment, due to the large weight of the optical probe, the counterbalance weights 44, 45 only partially counterbalances the weight of the probe 27 (however, as will be understood this need not necessarily be the case and the counterbalance weights 44 could substantially counterbalance the weight of the optical probe 27). Furthermore, the articulated head 24 is slightly different in that the rotatable part 32 can only rotate through 90° about the A2 axis—it has internal end stops which limit the rotation of the probe module mount 31 between (in the embodiment described with a vertical Z-column) a vertical orientation and a horizontal orientation.

With reference to FIG. 7(a), this embodiment is similar to that shown in FIGS. 2(a) and 2(b) in that the arms 42 and counterbalance weights 44 are completely clear of the articulated head 24 in all possible orientations of the contact probe 26. As illustrated on the right-hand side of FIG. 7(a), if the rotatable part 32 rotates in the direction illustrated by arrow A too quickly (for instance because power to the head has been lost and hence the probe 27 rotates under its own weight (because the counterbalance weights 44 only partially counterbalance the optical probe 27)), then when the rotatable part 32 hits its internal end stop, the angular momentum of the optical probe 27 will cause the optical probe 27 and the probe counterweight 28 to peel free from the magnetic joint of the probe module mount 31 in the direction shown by arrows B.

With reference to FIG. 7(b), the two probe counterbalance weights 44 have been replaced by a single cross-bar counterbalance weight 45 which extends between the two arms 43 (of only which one is shown in FIG. 7(b)) across the back of the articulated head 24. The arms 43 are angled such that a face 47 of the cross-bar 45 only comes into contact with the back face 49 of the articulated head's Z-column mount 48 when the rotatable part 32 and hence the probe module mount 31 are at their vertical extreme. Accordingly, in this embodiment, if the rotatable part 32 rotates in the direction illustrated by arrow A too quickly then when the rotatable part 32 hits its internal end stop, the cross-bar 45 prevents the optical probe 27 and the probe counterweight 28 from peeling free from the magnetic joint of the probe module mount 31.

Optical probes typically require a power source. When this is provided as a source internal to the probe (for instance via one or more batteries), the power source contributes to a significant proportion of the weight of the optical probe, with optical components such as lenses providing another significant proportion of the weight. In an alternative embodiment, a power source such as a battery or batteries could be provided as part of the probe counterweight 28. For instance, with reference to FIGS. 7(a) and 7(b) the counterbalance weights 44, 45 could comprise the power source. Power could be supplied to the optical probe 27 across the interface between the optical probe 27 and the probe counterweight 28 via electrical contacts. For instance, power could be supplied across the mounting features 21. Further still, the counter balance weights 44, 45 could comprise other electrical componentry such as processors and memory. Again, data from the optical probe could be supplied to the processors and memory via, for example, electrical contacts which bridge the interface between the optical probe 27 and the probe counterweight 28 (for example, across the mounting features 21).

FIG. 5(a) shows an alternative embodiment in which a dedicated probe counterweight mount 33 to which a probe counterweight 35 can be mounted directly is provided on the rotatable part. The dedicated probe counterweight mount 33 is provided on the opposite side of the rotatable part 32 of the articulated head 24. This embodiment avoids the need for the probe counterweight 35 to have arms extending around the articulated head 24. FIG. 5(b) is a similar embodiment, but in which a greater weight is provided for the probe counterweight 35 in order to counterbalance the longer probe body 26.

FIG. 6(a) shows a further alternative embodiment which is substantially the same as that shown in FIG. 5(a), but in which the articulated head's rotating part 32 is supported by bearings on only one side. Again, a dedicated probe counterweight mount 33 to which a probe counterweight 35 can be mounted directly is provided on the rotatable part 32. FIG. 6(b) again is a similar embodiment, but in which a greater weight is provided for the probe counterweight 35 in order to counterbalance the longer probe body 26.

As will be understood, rather than a greater weight being provided in the FIGS. 5(b) and 6(b) embodiments, multiple probe counterweights 35 can be stacked on top of each other to counterbalance the bigger gravitational torque provided by the longer probe body (i.e. due to its greater weight and greater distance between its centre of mass and the rotational axis A2).

Furthermore, as will be understood, the rotatable part 32 of the articulated head 24 can be configured such that it is inherently unbalanced about its horizontal rotational axis A2, i.e. it is unbalanced when no interchangeable probe module counterweight or interchangeable probe module is mounted on the head 24. This can reduce the required weight of the interchangeable probe module counterweight(s).

FIG. 8(a) shows a yet further alternative embodiment which is similar to those described above and in which like parts share like reference numerals. In this case, a bore 35 is provided through the rotatable part 32 of the articulated head 24 and the probe counterweight 28 comprises a bar which extends through the bore 35 so as to counterbalance the weight of the contact probe 26 about the A2 axis. FIG. 8(b) is similar except that the contact probe 26 is longer and hence the counterweight 28 has been modified (in this case by extending the probe counterweight 28) so as to counterbalance the contact probe 26 about the A2 axis. As will be understood, depending on the configuration of the probe counterweight 28 and contact probe 26, the bar need not necessarily extend all the way through the bore so as to counterbalance the contact probe 26 about the A2 axis. For instance, the probe counterweight 28 could be configured such that the significant majority of its weight is at its end distal to the contact probe 26 such that it needs to extend only a short way past the A2 axis, and not so far as all the way through the rotatable part 32 in order to counterbalance the weight of the contact probe 26. In such cases, the bore 35 need not necessarily extend all the way through the rotatable part 32—for instance it could be a blind bore open at one end only.

Figure 10:
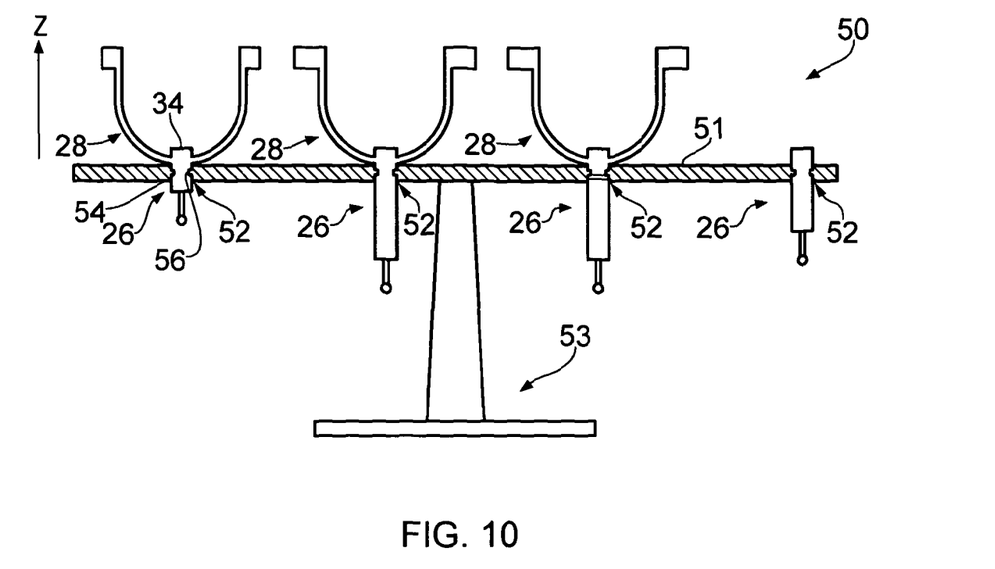
FIG. 10 is a schematic front view of a storage rack in which probe module counterweights and probe modules can be stored.

FIG. 10 illustrates a storage rack 50 for storing a plurality of probe counterweights 28 and probe modules such as contact probes 26. The storage rack comprises a plurality of storage ports 52 in which the probe counterweights 28 and probe modules 26 can be received and stored. As shown, the storage ports 52 are spaced along a plate member 51 which is held by a base member 53. The storage ports 52 comprise projections 54 for engaging with corresponding recesses 56 provided on the part to be stored in the storage rack (as will be understood, the recesses and projections can be provided the other way around). When a probe counterweight or probe module is stored in a port, the corresponding projections 54 and recesses 56 engage so as to suspend the probe counterweight or probe module in the rack 50 as shown.

Typically, the storage rack 50 will be located within the working volume of the CMM 10. Accordingly, a probe counterweight and/or probe module can be automatically loaded onto the probe module mount 31 of the articulated head 24 by the controller 30 being programmed to control the CMM 10 so as to bring the probe module mount 31 into engagement with the mounting face 34 of the probe counterweight and/or probe module and then to control the CMM 10 to slide the probe counterweight and/or probe module out of the storage port 52 so as to free the recesses 56 from the projections 54. Likewise, a probe counterweight and/or probe module can be automatically unloaded from the probe module mount 31 of the articulated head 24 and stored in the storage rack 50 by the controller 30 being programmed to control the CMM 10 so as to slide the probe counterweight and/or probe module into the storage port 52 so that the recesses 56 engage the projections 54, and then the probe counterweight and/or probe module is released from the probe module mount 31 by the controller 30 controlling the articulated head to move in the Z dimension away from the storage rack (as illustrated by arrow Z) so as to pull the probe module mount 31 off the probe counterweight and/or probe module.

As will be understood, other mechanisms for facilitating automatic interchanging of the probe module counterweight and/or the probe module can be used and are for example described in U.S. Pat. Nos. 4,651,405, 5,971,903 and 7,024,783.

As shown, the storage rack 52 can be used to store a wide variety of probe counterweights and probe modules, including integrated probe counterweights and probe modules, as well as probe counterweights and probe modules that are provided as separate parts. Furthermore, the probe counterweights and probe modules that are provided as separate parts can be stored together in one port or in separate ports.

Figure 11:
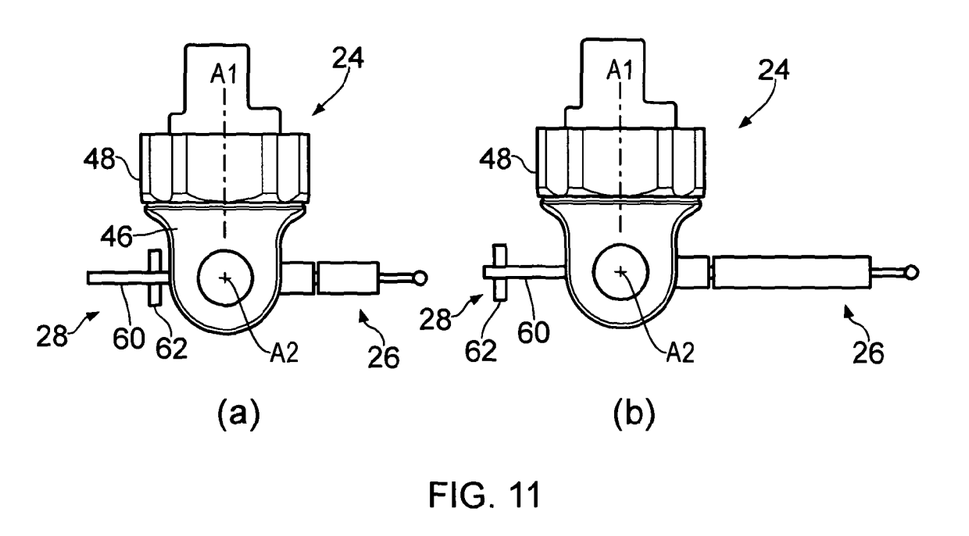

FIGS. 11(a) and (b) illustrate another way in which the invention might be embodied. In this embodiment, the interchangeable task module counterweight 28 has provision for changing the location of its centre of mass relative to the horizontal axis A2. As shown, this is provided by a counterbalance weight 62 which can be moved to different positions along a rod 60 which is interchangeably fixed to the rotatable part (not shown in FIG. 11) of the articulated head 24 and which extends away from the horizontal axis A2. In the embodiment shown, only one counterbalance weight 62 is used. However, as will be understood, a plurality of counterbalance weights 62 could be provided on the rod 60.

As will be understood, a mechanism can be provided for securing the position of the counterbalance weight 62 along the rod. For example, in the embodiment described the rod 60 has a plurality of holes (not shown) along its length, and the counterbalance weight 62 has a spigot (not shown) which can engage the holes to secure the position, but which can also be retracted so as to enable the position of the counterbalance weight 62 along the rod to be changed. In an alternative embodiment, the rod 60 could be threaded and the counterbalance weight 62 could have a correspondingly threaded bore. The counterbalance weight 62 could hence be moved along the rod by the turning of the counterbalance weight. In a further embodiment, the articulated head 24 could comprise a motor for moving the rod 60 into and out of the articulated head 24 so as to change the rod's 60 centre of mass relative to the rotational axis A2. In this case the provision of a separate counterbalance weight 62 is optional because the rod itself could provide the entire changeable counterbalance weight.

As will be understood, the torque provided by the task module counterweight 28 can be reduced by moving the counterbalance weight 62 closer to the horizontal axis of the rotation A2, and increased by moving the counterbalance weight 62 further away from the horizontal axis of the rotation A2. Accordingly, as shown in FIGS. 11(a) and (b), the counterbalance weight 62 is closer to the horizontal axis A2 in FIG. 11(a) than it is in FIG. 11(b) because the probe module 26 in FIG. 11(a) is shorter and lighter than that used in the embodiment shown in FIG. 11(b) and hence less torque is required to counterbalance the weight of the probe module 26.

In the embodiment described, the at least one changeable task module counterweight is a passive member. Accordingly, the change in position of the centre of mass of the at least one changeable task module counterweight is effected manually, e.g. by an operator moving the position of a counterbalance weight. As will be understood, the coordinate positioning apparatus could comprise a tool for automatically changing the position of the centre of mass of the passive changeable task module counterweight. For instance, the articulated head 24 could be controlled by the controller 30 to move the counterbalance weight 62 into a clamp device (not shown) which holds the counterbalance weight 62 whilst the articulated head 24 is moved in a direction parallel to the extent of the rod 60 to alter the relative position of the rod 60 and counterbalance weight 62.

In an alternative embodiment, the at least one changeable task module counterweight could comprise an active member for effecting the change of the position of the centre of mass of the at least one changeable task module counterweight. For instance, the at least one changeable task module counterweight could comprise at least one motor for moving the counterbalance weight 62 along the rod 60.

As will be understood, at least one interchangeable task module counterweight can be used in addition to a task module counterweight that can be changed so as to alter the position of its centre of mass.

Figure 12:
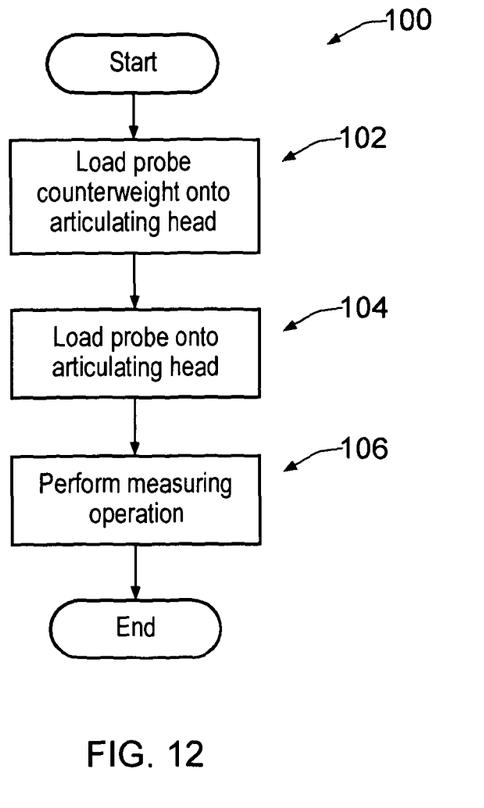
FIG. 12 is a flow chart illustrating a process of operating a coordinate positioning apparatus according to the present invention.

FIG. 12 is a flow chart illustrating a process 100 for operating the CMM 10 according to the embodiment of the invention illustrated in FIG. 4(a). At a first step 102, a probe counterweight 28 is loaded onto the articulated head's probe mount 31. A contact probe 26 is then, at step 104, loaded onto probe counterweight via the mount provided by the probe counterweight 28. The CMM 10 can then be used at step 106 to measure an artefact in a normal manner. As will be understood, the order in which the steps 102 and 104 can be performed varies depending on the embodiment of the invention used. For example, in embodiments in which the contact probe 26 is not mounted onto the articulated head 24 via the probe counterweight, the loading of the probe counterweight 28 can be performed after the loading of the contact probe 26. Furthermore, steps 102 and 104 can be performed contemporaneously, e.g. in embodiments in which the contact probe 26 and probe counterweight 28 are provided as a single part, or in which the contact probe 26 and separate probe counterweight 28 have previously been mounted to each other.

As will be understood, in the embodiment of FIGS. 11(a) and (b), the first step of the process 100 of FIG. 12 will not necessarily involve loading a probe module counterweight. Rather, it could simply involve changing the position of the counterbalance weight 62. Furthermore, this step could be performed after the loading of the interchangeable probe module on the articulated head.

In the majority of the embodiments described above, the contact probe 26 is a touch trigger probe. As will be understood, the contact probe 26 need not necessarily be a touch trigger probe. Rather, the contact probe 26 could be an analogue probe (also known as a scanning probe) in which the extent of deflection of the stylus tip can be measured and recorded. Furthermore, probes other than contact probes could be used. For example, non-contact probes such as capacitive probes, inductive probes and optical probes could be used.

It can be preferred that the rotatable part 32 is inherently unbalanced about the A2 axis. That is it could be weighted on its side opposite the probe module mount 31. As will be understood, due to the interchangeable nature of the probe modules, interchangeable probe counterweights can be desirable to help counterbalance the weight of the probe module, but the use of an inherently unbalanced rotatable part can reduce the counterbalancing effect that needs to be provided by the probe counterweight because part of the counterbalancing effect will be provided by the rotatable head.

In the above described embodiments the coordinate positioning apparatus is a CMM and the type of task module mounted on the CMM is a probe module, in particular for measuring the dimensions of an artefact. As will be understood, task modules other than probe modules can be used. For instance, the task module could be a tool module. In particular, the task module could comprise a tool for machining an artefact, e.g. by cutting or milling the artefact. For instance, in the embodiments described above, the probe module could be replaced by a laser module which can be used to, process, cut and or etch an artefact placed on the table of the CMM.

Furthermore, this invention is also suitable for use with a task module mounted on machine types other than a CMM. For example, the coordinate positioning apparatus could comprise, for example, a robotic arm having several articulating joints.

The invention claimed is:

1. A method of operating a coordinate positioning apparatus comprising an articulated head having at least one rotational axis, comprising, in any suitable order:
loading at least one interchangeable task module onto the articulated head; and
loading at least one interchangeable task module counterweight on the articulated head,
in which the at least one interchangeable task module counterweight at least partially counterbalances the weight of the at least one task module on the articulated head about the at least one axis.

2. A method as claimed in claim 1, in which said loading of the at least one interchangeable task module and at least one interchangeable task module counterweight is performed contemporaneously.

3. A method as claimed in claim 2, in which the at least one interchangeable task module and at least one interchangeable task module are provided as a single integrated module.

4. A method as claimed in claim 2, in which the interchangeable task module is mounted to the articulated head via the at least one interchangeable task module counterweight.

5. A method as claimed in claim 1, in which the at least one interchangeable task module is loaded onto the articulated head separately to the at least one interchangeable task module counterweight.

6. A method as claimed in claim 1 comprising loading at least one interchangeable task module counterweight on the articulated head so as to at least substantially counterbalance the loading of the at least one task module on the articulated head about the at least one axis.

7. A method as claimed in claim 1, further comprising changing the position of the centre of mass of the at least one interchangeable task module counterweight relative to the at least one axis of rotation.

8. A method as claimed in claim 1, comprising automatically loading onto the articulated head at least one interchangeable task module counterweight stored in a rack located in the coordinate positioning machine's operating volume.

9. A method as claimed in claim 1 in which at least one of the at least one task module comprises componentry for sensing an artefact.

10. A method as claimed in claim 9, in which at least one of the at least one task module comprises a stylus having a stylus tip for contacting an artefact.

11. A method as claimed in claim 9, in which at least one of the at least one task module comprise a non-contact measurement probe.

12. A method as claimed in claim 1 in which at least one of the at least one interchangeable task module counterweights comprises electronic componentry used by the task module.

13. A method as claimed in claim 12, in which the electronic componentry comprises a battery for supplying power to the task module.

14. A method as claimed in claim 1, in which the interchangeable task module counterweight comprises an anti-rotation member that is configured to engage the articulating head and/or the quill on which it is mounted at at least one orientation about the at least one axis of rotation.

15. A coordinate positioning apparatus comprising:
an articulated head having at least one axis of rotation;
at least one task module interchangeably mounted to the articulated head; and
at least one interchangeable task module counterweight which at least partially counterbalances the weight of the at least one task module about the at least one axis of rotation.

16. A coordinate positioning apparatus as claimed in claim 15, in which the position of the centre of mass of the at least one interchangeable task module counterweight relative to the at least one axis of rotation is changeable.

17. A coordinate positioning apparatus as claimed in claim 15, in which the at least one interchangeable task module comprises the interchangeable task module counterweight.

18. A coordinate positioning apparatus as claimed in claim 15, in which the at least one interchangeable task module counterweight can be mounted interchangeably to the articulated head separately to the probe module.

19. A coordinate positioning apparatus as claimed in claim 15, in which at least one of the at least one task module comprises componentry for sensing an artefact.

20. A coordinate positioning apparatus as claimed in claim 19, in which at least one of the at least one task module comprises a stylus having a stylus tip for contacting an artefact.

21. A coordinate positioning apparatus as claimed in claim 19, in which at least one of the at least one task module comprise a non-contact measurement probe.

22. A coordinate positioning apparatus as claimed in claim 15 in which the at least one interchangeable task module counterweight corresponds to the at least one task module and is configured so as to substantially counterbalance the at least one task module about the at least one axis.

23. A coordinate positioning apparatus as claimed in claim 15 in which at least one of the at least one interchangeable task module counterweights comprises electronic componentry used by the task module.

24. A coordinate positioning apparatus as claimed in claim 23, in which the electronic componentry comprises a battery for supplying power to the task module.

25. A coordinate positioning apparatus as claimed in claim 15, in which the interchangeable task module counterweight comprises an anti-rotation member that is configured to engage the articulating head and/or the quill on which it is mounted at at least one orientation about the at least one axis of rotation.

26. A coordinate positioning apparatus as claimed in claim 15, comprising a rack for the at least one interchangeable task module counterweight, via which the coordinate positioning apparatus can automatically load/unload the at least one interchangeable task module counterweight onto/from the articulated head.

27. Apparatus comprising a task module for interchangeably mounting onto an articulated head of a coordinate positioning machine having at least one axis of rotation, and at least one corresponding task module counterweight for interchangeably mounting onto the articulated head for at least partially counterbalancing the weight of the task module about the at least one axis.

* * * * *